(No Model.)
W. C. HOMAN.
SUSPENSION DEVICE FOR LAMPS.
No. 397,462. Patented Feb. 5, 1889.
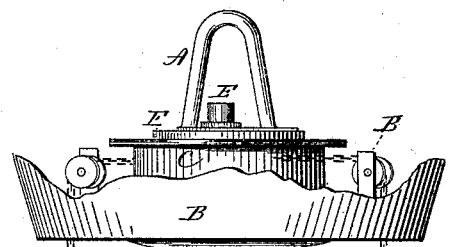
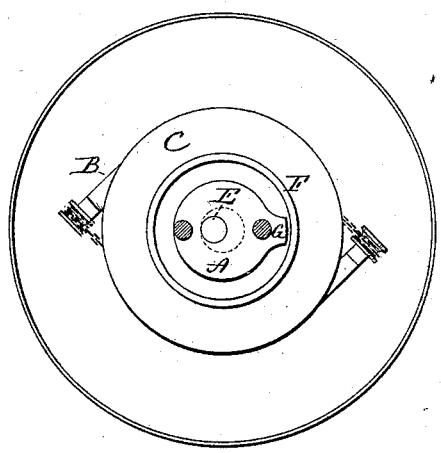
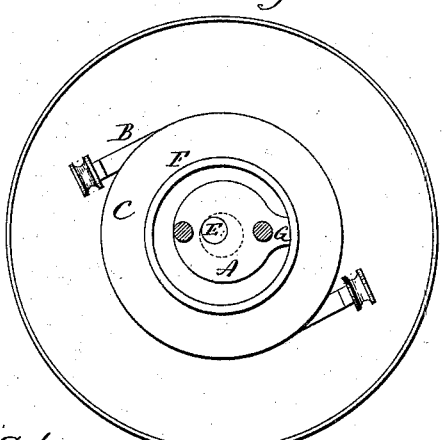
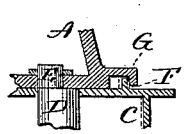
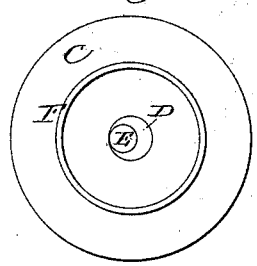
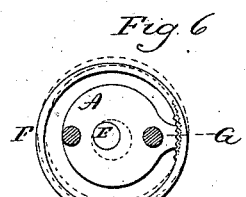
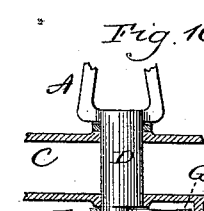
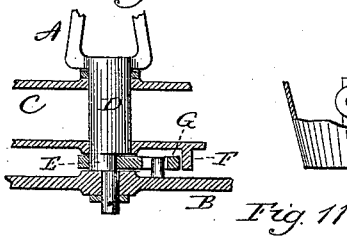
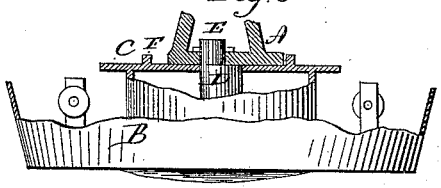
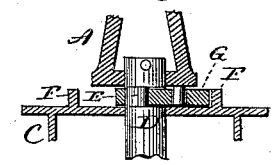
Witnesses
J. P. Shumway
F. C. Earle
Wm. C. Homan, Inventor
By atty

UNITED STATES PATENT OFFICE.

WILLIAM C. HOMAN, OF MERIDEN, CONNECTICUT, ASSIGNOR TO EDWARD MILLER & COMPANY, OF SAME PLACE.

SUSPENSION DEVICE FOR LAMPS.

SPECIFICATION forming part of Letters Patent No. 397,462, dated February 5, 1889.

Application filed June 25, 1888. Serial No. 278,106. (No model.)

*To all whom it may concern:*

Be it known that I, WILLIAM C. HOMAN, of Meriden, in the county of New Haven and State of Connecticut, have invented a new Improvement in Suspension Devices for Lamps, &c.; and I do hereby declare the following, when taken in connection with accompanying drawings and the letters of reference marked thereon, to be a full, clear, and exact description of the same, and which said drawings constitute part of this specification, and represent, in—

Figure 1, a side view of the suspension device, a portion of the canopy being broken away for convenience of illustration; Fig. 2, a plan or top view of the same, showing the dog and flange in the disengaged position; Fig. 3, the same view indicating a partial rotation of the frame in a horizontal plane, whereby the dog and drum are brought into engagement; Fig. 4, a top view of the drum and spindle, showing the eccentric on the spindle; Fig. 5, a vertical central section of the suspension device complete; Figs. 6, 7, 8, 9, 10, and 11, modifications of the invention.

This invention relates to an improvement in that class of suspension devices for hanging lamps or chandeliers in which the lamp-supporting devices are made adjustable, so as to stand at different elevations, and in which the suspending power for the adjustable portion of the fixture is a spring-drum, from which chains extend to the said adjustable portion of the fixture, and so that as the fixture is drawn downward the chain or chains will be drawn from the drum and impart a rotation to the drum to wind the spring, and so that the reaction of the spring when free will raise or aid in raising the said adjustable portion of the fixture. The weight of the adjustable portion of the fixture, be it lamp or chandelier, is necessarily variable to a considerable extent, such variation occurring by the presence or absence of a shade, or greater or less weight of a shade, or the increase or decrease of oil in the fount, or by the introduction or removal of the fount. It is therefore necessary that there should be some means provided which will compensate for such variation in the fixture, because if the spring be set so as to hold the adjustable portion of the fixture at a predetermined point when, say, the founts and shades are in place, if the founts or shades be removed the weight of the fixture will be so much reduced that the reaction of the spring will at once cause the remaining portion of the fixture to rise, and so if the weight of the adjustable portion be increased by the addition of extra shades or from other causes the spring would fail to support the adjustable part of the fixture and it would descend. To overcome this difficulty, frictional devices have been introduced, which will apply a friction sufficiently great to overcome the variations in weight. This friction has been in some cases constant and in other cases it has been relieved. In some of the relief devices forcibly raising the adjustable portion of the fixture will throw the frictional device out of engagement, so as to leave the spring-drum free to raise the fixture; but the friction remains applied as the fixture is pulled downward. In other cases engaging devices have been applied to the drum or to something in connection therewith, and from which devices an extension is made to some point below, as by a rod through the central shaft of a chandelier, or by chains or cords extending down outside the shaft, or outside the central shaft, or lamp-holder itself in the case of a hanging lamp. In other cases, as in the patent of Frank Rhind, No. 383,769, dated May 29, 1888, the frame carrying the drum is hung to a stationary hanger or loop by which the whole apparatus is attached to the ceiling, and so that the frame may be permitted a rotation upon the axis between it and the hanger, the rotation being in a horizontal plane, and which rotation in one direction disengages the drum, and so that it is free to revolve for the pull-down to wind the spring, or for the pull-up under the reaction of the spring, then a return of the drum-frame will re-engage the drum with the said hanger and produce such an engagement as to arrest the revolution of the drum and cause it to stand at the point where it may be so engaged until relieved therefrom by the first-mentioned rotation of the drum.

It is to this latter class of suspending devices that my invention particularly relates, it having for its object a simple and effective device to engage the drum with the hanger or disengage it therefrom under a rotation of the drum-carrying frame in a horizontal plane; and it consists in the construction, as hereinafter described, and particularly recited in the claims.

A represents the hanger by which the whole apparatus is hung to the ceiling, and may be of any of the usual forms, the said hanger being stationary on the ceiling, so as to prevent its rotation, and as usual with such hangers, and particularly as in the said Rhind patent.

B represents the frame which carries the drum C. From the frame a central spindle, D, extends upward and forms the axis about which the drum C will revolve, the upper end of the said spindle being engaged with the hanger, so as to be supported thereby, but yet so as to allow a rotation of the frame in a horizontal plane. The drum is concentric with the spindle D; but the extension E of the spindle to form connection with the hanger is eccentric to the spindle and takes a bearing in the hanger, as seen in Fig. 5, and so that the drum and its frame may rotate on an axis formed by the said extension E of the spindle, but which axis is eccentric to the axis of the drum and the spindle D. The head of the drum next the hanger is constructed with a circular flange, F, concentric with the drum itself, and therefore eccentric to the axis of the frame in the hanger. Within this flange a radial projection, G, is made from the base of the hanger, which forms a dog to engage the flange F. The length or projection of the dog is such that when the spindle and the drum stand at their greatest eccentricity, as seen in Fig. 2, the dog will not quite reach the inner surface of the flange F; but when the frame carrying the drum and the spindle D is given a partial rotation to reduce the eccentricity between the spindle and the hanger, then the dog is brought into engagement with the inner surface of the flange, as seen in Fig. 3, and this engagement of the dog with the flange, being forcibly made, interlocks the hanger with the drum.

The rotation to the frame is imparted by turning the portion of the fixture which is suspended from the drum, as in the Rhind patent before referred to—that is to say, the position Fig. 3 indicates the normal position of the parts when the drum is so engaged as to permit its rotation, in which condition the spring is prevented from operating, so that no matter what change may be made in the weight of the suspended portion of the fixture it will retain the position where the drum is so engaged; but if the frame be given a rotation, say, to the position seen in Fig. 2 the eccentricity of the spindle will cause the flange of the drum to escape and recede from the nose of the dog, as seen in Fig. 2, and there leave the drum free to revolve, as in either pulling down or raising the suspended portion of the fixture to any desired elevation. When that desired point is reached, the suspended portion of the fixture is returned to the position seen in Fig. 3, to again bring the dog into engagement with the flange of the drum. This arrangement of the dog upon an eccentric between the hanger and the frame makes a firm engagement between the drum and the dog, but yet so that disengagement is easily made by the rotation of the frame, as I have described and as in the said Rhind patent.

Ordinarily a smooth surface on the nose of the dog and corresponding smooth surface upon the flange will be sufficient to make the desired engagement; but any suitable engaging-surface may be provided between the flange and dog—as, for illustration, to make a firmer engagement, the nose of the dog may be made in the form of a tooth or teeth, as seen in Fig. 6, and the flange correspondingly toothed. The rotation of the frame will cause the flange to recede from such engagement with the dog, as before, and as indicated in broken lines, Fig. 6, it being understood that while the drum is engaged with the dog the frame is still free to rotate independent of the drum, so that in rotating the frame by the corresponding rotation of the suspended portion of the fixture below, the drum will remain in connection with the dog, and therefore stationary, until by the eccentricity of the spindle the flange has been withdrawn from its engagement with the dog.

I have represented the dog as engaging the flange upon the inside, and this I prefer for obvious reasons; yet the nose of the dog may overlap the flange and so as to take a bearing upon the outside, as seen in Fig. 7, the illustration showing the nose of the dog upon the opposite side of the hanger to that which is represented in Figs. 2 and 3, so that the same rotation which I have described will produce the disengagement of the flange with the dog, as indicated in broken lines, Fig. 7.

I have thus far represented the dog between the hanger and the drum as made an integral part of the hanger, in which case the axis of connection between the hanger and the frame is eccentric to the drum, but the dog may be made separate from the hanger, as seen in Figs. 8 and 9, in which case the eccentric is formed on the spindle, as before; but in this case the spindle may be concentric with the hanger, as seen in Fig. 9, and in this case the dog is held by the hanger, so as to prevent its rotation with the frame or spindle, and so that as the spindle revolves its eccentric within the hub of the dog will impart radial movement to the dog to force it into or take it out of engagement with the drum.

In Fig. 8 the holding of the dog by the hanger is represented as by a stud on the hanger extending down into a radial slot in the dog.

Instead of forming the flange upon the upper side of the drum and the dog accordingly, the flange and the dog may be below the drum—say as seen in Fig. 10. In this illustration the spindle D is made an integral or stationary part of the hanger, and the drum and the frame are arranged concentrically on the spindle; but the spindle is constructed with the eccentric E between the hanger and frame, but below the drum, and the dog G arranged on the eccentric, and the flange F is also arranged upon the lower side of the drum, as seen in Fig. 10; but under this construction the dog will rotate with the frame to take it out of engagement with the drum. In order to make such rotation of the dog with the frame, and yet permit the dog to work freely upon the eccentric, the frame is provided with a stud and the dog with a radial slot, substantially the same as between the hanger and dog in Fig. 8, and as seen in Fig. 11, which will support the dog in its proper connection with the frame. It is, therefore, not necessary that the dog shall be held stationary as to rotation with the hanger, but that the hanger shall be stationary while the frame is permitted a limited rotation and the dog in connection with an eccentric between the hanger and frame, whereby the rotation of the frame through the said eccentric will produce the engaging and disengaging of the dog.

It will be understood that this suspension device is applicable alike to hanging lamps—such as commonly called "library-lamps"—or to chandeliers, the adaptation of the supporting-chains for either purpose being too well known to require illustration.

From the foregoing it will be evident that I do not claim, broadly, a stationary hanger, a frame hung thereto carrying a revolving drum, and a dog between the said stationary hanger and the drum, so as to engage the said drum, engagement and disengagement being produced by a partial rotation of the drum-carrying frame in a horizontal plane; but What I do claim is—

1. The combination of a frame, a stationary hanger, a spindle forming a connection between the frame and hanger, but so as to permit a limited rotation of said frame in a horizontal plane while the hanger remains stationary, a spring-drum arranged in said frame upon said spindle, one or more chains extending from said drum, the drum provided with a flange concentric with said spindle, an eccentric on the spindle between the hanger and frame, and a dog in connection with said eccentric, the nose of the dog being adapted to engage said flange on the drum, substantially as described, and whereby under a rotation of said drum in one direction disengagement between said flange and dog will be produced by the said eccentric, or the frame turned in the opposite direction will produce an engagement between said flange and dog.

2. The combination of the stationary hanger A, the frame B, having a vertical spindle, D, extending therefrom, the upper end of the spindle constructed with an eccentric extension, E, into said hanger, and which eccentric extension forms a pivot in the hanger for the horizontal rotation of the frame, a spring-drum, C, arranged upon said spindle as its axis of revolution, one or more chains extending from said spring-drum, the head of the drum next the hanger constructed with a flange, F, concentric with the spindle, but eccentric to the said extension or pivot E, the hanger constructed with a dog, G, within said flange, the nose of the said dog adapted to engage or disengage said flange on the drum, substantially as and for the purpose described, and whereby under the rotation of the frame in a horizontal plane in one direction the dog and flange of the drum are disengaged, but under a rotation of the frame in the opposite direction the said flange and dog are brought into engagement.

WM. C. HOMAN.

Witnesses:
FRED C. EARLE,
LILLIAN D. KELSEY.